United States Patent [19]

Sealock, Jr. et al.

[11] Patent Number: 4,971,703
[45] Date of Patent: Nov. 20, 1990

[54] TREATMENT METHOD FOR EMULSIFIED PETROLEUM WASTES

[75] Inventors: L. John Sealock, Jr., West Richland; Eddie G. Baker; Douglas C. Elliott, both of Richland, all of Wash.

[73] Assignee: Battelle Memorial Institute, Richland, Wash.

[21] Appl. No.: 397,163

[22] Filed: Aug. 21, 1989

[51] Int. Cl.$^5$ .............................................. B01D 17/04
[52] U.S. Cl. ................................... 210/708; 210/737; 210/763; 210/766; 210/774; 210/808; 208/13
[58] Field of Search ............... 210/708, 737, 741, 742, 210/763, 766, 774, 808, 187; 208/13

[56] References Cited

U.S. PATENT DOCUMENTS

| | | | |
|---|---|---|---|
| 2,152,863 | 4/1939 | Bills | 210/774 |
| 2,181,684 | 11/1939 | Walker | 210/774 |
| 2,305,464 | 12/1942 | Ashworth | 210/737 |
| 3,576,738 | 4/1971 | Duffy | 210/763 |
| 3,606,731 | 9/1971 | Cole et al. | 210/170 |
| 3,716,474 | 2/1973 | Hess et al. | 210/774 |
| 3,731,801 | 5/1973 | Hess et al. | 210/737 |
| 3,804,756 | 4/1974 | Callahan et al. | 210/763 |
| 3,870,631 | 3/1975 | Fassell et al. | 210/762 |
| 4,014,780 | 3/1977 | McCoy | 208/13 |
| 4,160,742 | 7/1979 | Raman | 210/708 |
| 4,382,852 | 5/1983 | McCoy et al. | 210/708 |
| 4,383,927 | 5/1983 | Srivatsa | 210/708 |
| 4,387,017 | 6/1983 | McEntire et al. | 208/188 |
| 4,525,283 | 6/1985 | Horak et al. | 210/762 |
| 4,594,141 | 6/1986 | Paspek, Jr. et al. | 208/390 |
| 4,708,788 | 11/1987 | Low | 208/390 |

FOREIGN PATENT DOCUMENTS 258246 7/1948 German Democratic Rep. .

*Primary Examiner*—Peter Hruskoci
*Assistant Examiner*—Christopher Upton
*Attorney, Agent, or Firm*—Wells, St. John & Roberts

[57] ABSTRACT

An improved reclamation process for treating petroleum oil and water emulsions derived from producing or processing crude oil is disclosed. The process comprises heating the emulsion to a predetermined temperature at or above about 300° C. and pressurizing the emulsion to a predetermined pressure above the vapor pressure of water at the predetermined temperature. The emulsion is broken by containing the heated and pressurized fluid within a vessel at the predetermined temperature and pressure for a predetermined period of time to effectively separate the emulsion into substantially distinct first, second and third phases. The three phases are then separately withdrawn from the vessel, preferably without any appreciable reduction in temperature and pressure, and at least above a withdraw temperature of about 300° and above the vapor pressure of water at the withdraw temperature.

13 Claims, 4 Drawing Sheets

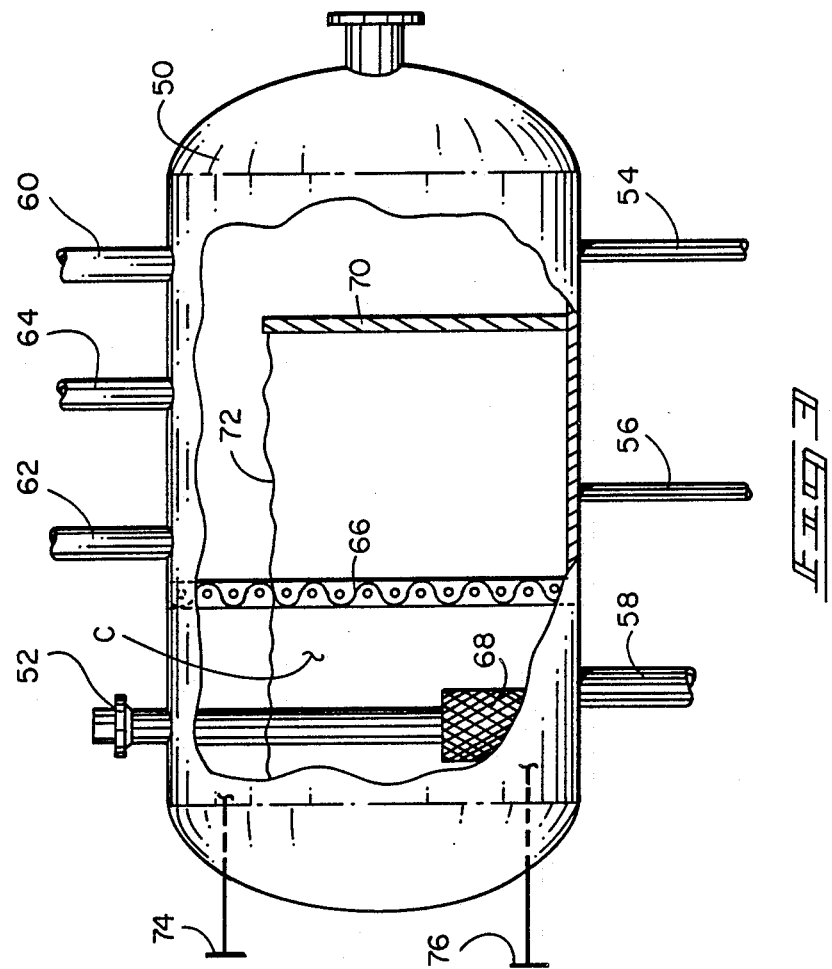

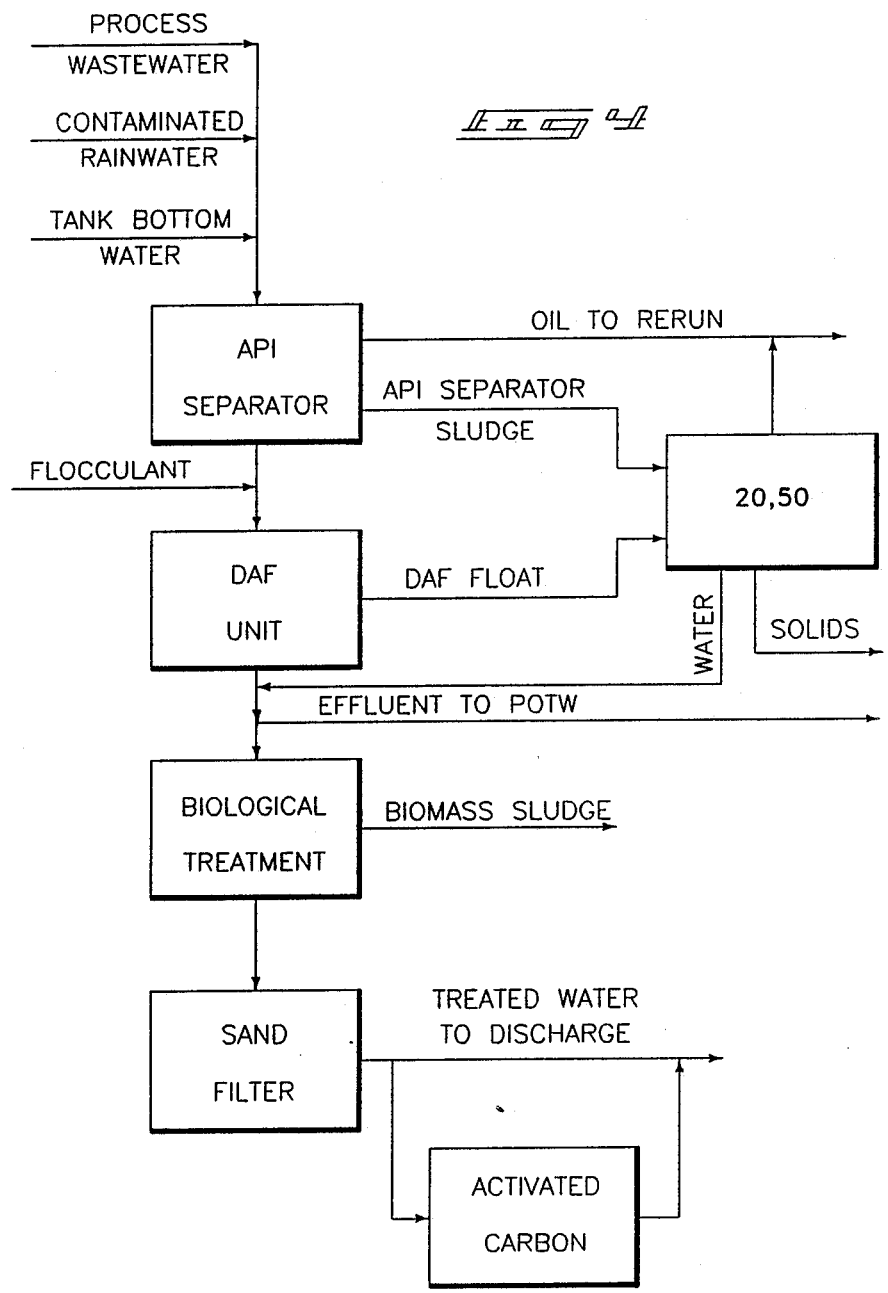

TREATMENT METHOD FOR EMULSIFIED PETROLEUM WASTES

DESCRIPTION

1. Technical Field

This invention relates to reclamation processes for treating highly stable petroleum oil and water emulsions derived from producing or processing crude oil, and particularly those emulsions having stabilizing retained solids suspended therein.

2. Background Art

Petroleum refinery wastes include emulsions which are typically oil-in-water emulsions stabilized by the presence of finely divided solids. Several of these emulsions have been categorized by the U.S. Environmental Protection Agency as being hazardous waste. The two most common of these wastes are API (American Petroleum Institute) Separator Sludge and DAF (Dissolved Air Flotation) Sludge or Float.

FIG. 1 illustrates a typical petroleum waste water treating system from which these wastes are derived. As shown, various sources of wastewater from the plant are first fed to a gravity separator 10, labeled an API Separator, to remove non-emulsified free floating oil. API Separator 10 partially separates the wastewater into a top oil phase, a middle oil/water interface, and a bottoms fraction which is comprised primarily of an aqueous solution. The oil is skimmed off the top, and re-fed to the refinery for production of saleable product.

The oil/water interface is in the form of a scum that is typically referred to as the API Separator Sludge, which is highly stable oil-in-water emulsion and classified hazardous waste. It is extracted from separator 10 separately from the bottoms aqueous fraction.

The bottoms fraction from separator 10 is then typically combined with alum to flocculate solids and emulsified oil droplets, and then fed to a DAF unit 11. Air bubbles are generated within DAF unit 11 and help float the flocculated material to the top of the solution where it is skimmed off. This removed material is classified as hazardous waste and referred to as DAF float.

The bottoms from DAF unit 10 is discharged to a public owned treatment works (POTW), or is further treated on-site. On-site treatment typically includes a biological treatment process 12 which produces a waste biomass sludge and wastewater stream. The wastewater stream is fed through a sand filter 13, and an activated carbon absorption process 14 is used if further treatment is required to meet discharge standards.

Currently, the most widely used method within the petroleum industry for disposing of such various wastes is "land treatment" or "land farming". However, the U.S. Congress in 1984 placed severe restrictions on land treatment methods that has the petroleum industry exploring other options. Refineries without permitted land treatment units will be forced to incinerate their waste prior to land disposal, unless other technologies become commercially available which can meet U.S. Environmental Protection Agency standards.

Because of the high cost and limited incinerator capacity in the U.S., the petroleum industry is considering alternative treatment technologies. Further, many of the waste sludges cannot be fired in conventional incinerators because of the solids content which is not conducive to on-site incineration. Mechanical methods such as centrifugation and filtration are being evaluated for treatment of some of these wastes, but have drawbacks and have not been generally accepted by the industry.

In addition to sludges and emulsions generated during refining operations, crude oil production operations also generate undesirable emulsions. These are typically water-in-oil emulsions which are also highly stabilized by retained solids. Most of these emulsions are not listed as hazardous waste, but costly chemical treatment is required before the oil can be further refined into finished saleable product. Often these treatments produce a secondary oil-in-water emulsion which must be further treated, or in other cases disposed of in accordance with accepted government standards.

A need remains for improved processes for reclaiming or disposing of petroleum oil and water emulsions derived from producing or processing crude oil.

BRIEF DESCRIPTION OF DRAWINGS

The preferred embodiment of the invention is described with reference to the accompanying drawings, where.

FIG. 3 is a fragmentary and diagrammatic side-elevational view of another vessel usable in accordance with the invention.

FIG. 4 is a block diagram illustrating integration of a method in accordance with the invention into a typical refinery waste water treatment system.

DISCLOSURE OF INVENTION AND BEST MODE FOR CARRYING OUT THE INVENTION

Figure 1:
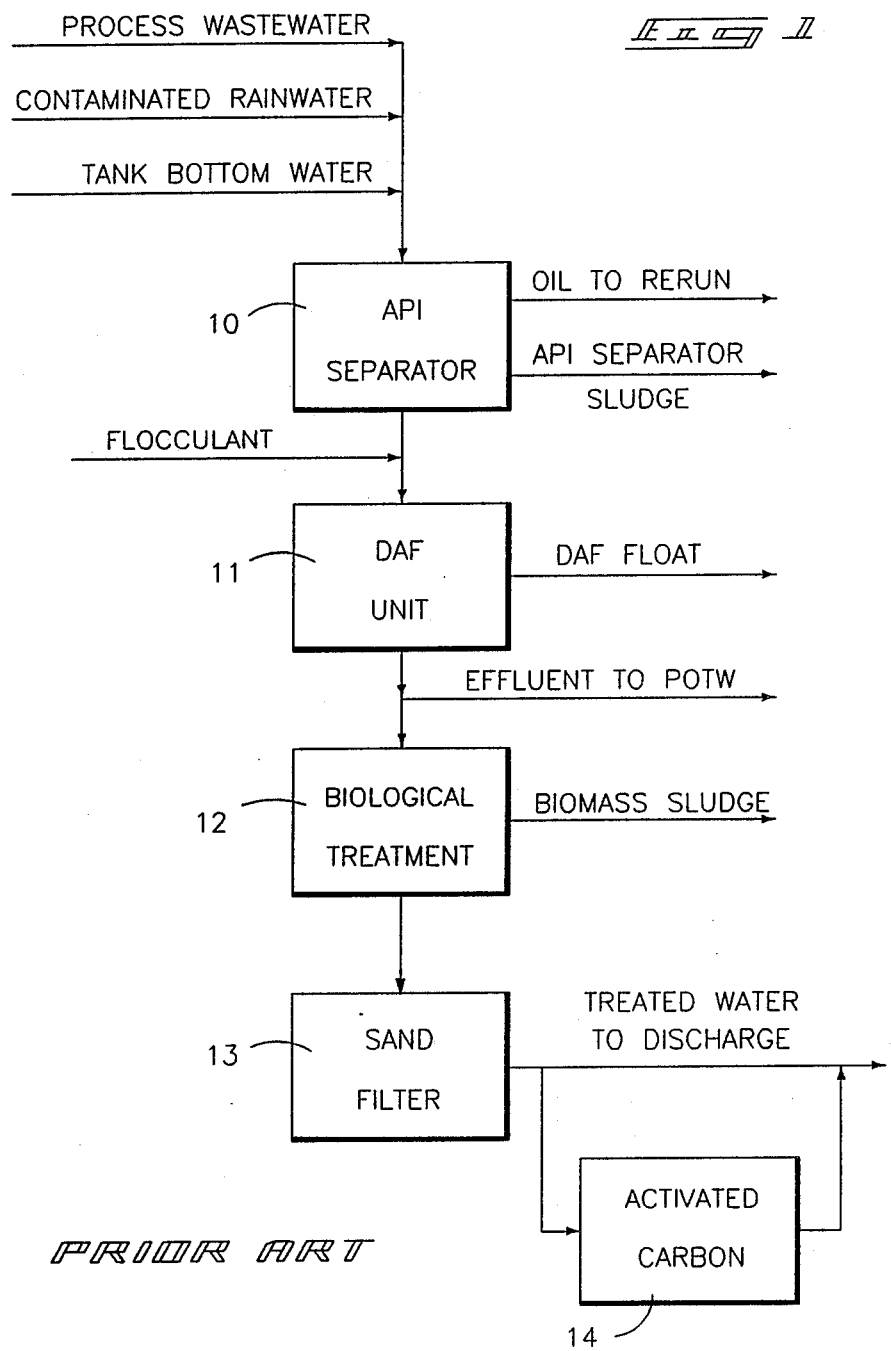
FIG. 1 is a block diagram of the existing, prior art, typical petroleum waste water treating system, and is referred to above.

The following disclosure of the invention is submitted in compliance with the constitutional purpose of the Patent Laws "to promote the progress of science and useful arts" (Article 1, Section 8).

An improved reclamation process for treating petroleum oil and water emulsions derived from producing or processing crude oil has been discovered. The process comprises heating the emulsion to a predetermined temperature at or above about 300° C. and pressurizing the emulsion to a predetermined pressure above the vapor pressure of water at the predetermined temperature. This will produce a heated and pressurized fluid. Preferably, the predetermined temperature is between about 300° C. and below the 374° C. critical point of water. Also preferably, the predetermined pressure is just above the vapor pressure of water at the predetermined temperature, to minimize energy costs. At 300° C. and 374° C. this pressure will be about 1400 psig and 3193 psig, respectively. At 350° C., this pressure will be about 2400 psig. The emulsion is broken by containing the heated and pressurized fluid within a vessel at the predetermined temperature and pressure for a predetermined period of time to effectively separate the emulsion into substantially distinct first, second and third phases. The first phase will be a high elevation phase within the vessel and comprise primarily the oil. The second phase will typically be beneath the first phase and comprise the water. The third phase will comprise primarily the solids and be included in the bottom portion of the water phase. The predetermined period of time will typically be less than or equal to about 60 minutes, and perhaps less than or equal to 15 minutes, to obtain the desired phase separations.

The three phases are then separately withdrawn from the vessel, preferably without any appreciable reduction in temperature and pressure, and at least above a withdraw temperature of about 300° and above the vapor pressure of water at the withdraw temperature. As the solids phase is included in the lower portion of the water phase, it typically will also include some water when withdrawn.

Tests were conducted in a one-liter batch reactor with refinery emulsions and oil-field emulsions to substantiate the invention. In tests with the refinery waste, distinct phase separations occurred and typically comprised a top oil layer, a middle water layer, and a bottom solids layer. In some cases a thin layer of solids appeared at the oil/water interface. Between 70% and 90% of the oil initially in the refinery emulsions was recoverable from the oil layer. The remainder was mostly converted to gas. The method in accordance with the invention provides a distinct advantage in that the oil and gas recovered can be reused in the refinery, whereas the existing disposal methods treat the oil (organic) part of the emulsion as unrecoverable waste.

Concerning oil field emulsions, one sample was tested and the best separation was achieved at a temperature of at least approximately 400° C. with use of a nickel catalyst with that sample. A heavy oil layer was then visible on top of a layer of secondary emulsion, which was atop two distinct lower phases of water and solids respectively.

The test results which were obtained were compared to standard filtration tests conducted by the American Petroleum Institute using API Sludge and DAF Float. The results obtained in accordance with the process of the invention were much more effective for recovering oil and reducing the oil content of the solids.

In a typical experiment, approximately 300 grams of waste material were loaded into a batch autoclave. The autoclave was then sealed, purged of oxygen, and pressure checked with nitrogen. The nitrogen was then vented until about 100 psig nitrogen remained. The autoclave was then heated to the desired temperature and held there for approximately one hour. The pressure in the autoclave increased as the result of the heating of the nitrogen, vapor pressure of water, and what little gas was produced in the process.

At the conclusion of a test, the autoclave was cooled rapidly by flowing water through cooling coils provided on the autoclave. The gas was vented through a wet test meter and analyzed by gas chromatography. The oil, water and solids layers were separated, and the weight of the oil and dry solids determined. The water was analyzed for chemical oxygen demand (COD). The dry solids were extracted with methylene chloride to determine organic content.

The three petroleum wastes tested consisted of an API Separator Sludge, A DAF Float and an intermediate oily waste water emulsion from which no solids or oil could be separated by conventional gravity separation. The available analysis of these materials is listed in Table 1 below:

TABLE 1

| | Analysis of Petroleum Wastes | | |
|---|---|---|---|
| | API Sludge | DAF Float | Third Emulsion |
| Oil Content, wt % | 12.4 | 17.6 | — |
| Solids Content, wt % | 5.5 | 6.0 | 0.7 |

TABLE 1-continued

| | Analysis of Petroleum Wastes | | |
|---|---|---|---|
| | API Sludge | DAF Float | Third Emulsion |
| Water Content, wt % | 82.1 | 76.4 | — |
| Ash Content, wt % | 2.0 | 2.4 | — |
| COD, mg/L | — | — | 110,000 |

Numerous experiments were conducted to identify the operating conditions usable in a larger-scale system, primarily temperature and residence time. The pressure is preferably determined by the required temperature, and will be above the vapor pressure of water to prevent water vaporization. The treatment will also preferably be conducted at below the critical temperature of the emulsion fluid to enable effective phase separation.

A first set of experiments was conducted to determine temperature effect on the separation. The above materials were separately charged to the autoclave, heated to the desired temperature, and held for one hour. The contents were then cooled and removed for analysis. Table 2 shows the results.

TABLE 2

| Effect of Temperature on Separation | | | | |
|---|---|---|---|---|
| | Oil Recovery in Oil Layer, wt % | Water COD mg/l | Oil Content of Solids, wt % | |
| | | | wet | dry |
| API Sludge | | | | |
| 350° C. | 97.3 | 3400 | 1.7 | 4.8 |
| 300° C. | 97.3 | 400 | 2.2 | 5.4 |
| 250° C. | 44.2 | 3100 | ~35 | 8.4 |
| DAF Float | | | | |
| 350° C. | 98.8 | 4900 | 1.3 | 3.5 |
| 300° C. | 41.0 | 4100 | ~50 | 9.5 |

The API Sludge separated into three distinct layers at the three temperatures tested. At 350° C. and 300° C., over 97% of the original oil in the sludge was recovered in the floating oil phase. The specific gravity of the oil was approximately 0.86 to 0.89, which is about the same as crude oil. The recovered water layer was clear, and had a chemical oxygen demand (COD) of 3400 to 4500 mg/l. The recovered solids were light gray, with no free oil being visible within the solids. The wet solids contained approximately 2% adsorbed oil, which corresponded to approximately 5% oil in the dry solids.

At 250° C., only 44% of the original oil was recovered in the oil layer. However, the appearance of the water layer was similar to the water layer produced at 350° C. and 300° C. The solids layers at 250° C., on the other hand, were dark brown and free oil was clearly visible. Based on the amount of unrecovered oil, the oil content of the wet solids was estimated to be about 35%.

In the b 350° C. experiment with the DAF Float, nearly 99% of the oil was recovered in the oil layer, with the wet solids containing only approximately 1.3% oil. The results at 300° C. were not as good, with only 41% of the oil being recovered in the oil layer, with the solids layer being brown and free oil being visible.

Tests were also conducted with the third emulsion which was comprised primarily of water. This material also separated into three distinct layers. The oil recovered from the oil layer at 350° C. and 300° C. was equal to 2% to 2.5% of the feed stream. The yield of dry solids was about 0.7%. At 250° C., the oil yield dropped to 0.7%, which indicates that treatment at this temperature is not as effective for this emulsion.

Another set of experiments was conducted to determine residence time required for separation, and to see if the phase separation takes place at elevated temperature and pressure, or occurs after sample cooling and pressure let-down. The batch autoclave was modified to enable small liquid samples to be drawn from near the bottom of the autoclave. The absence of oil from the withdrawn samples would indicate that the emulsion had broken and the oil had floated to the top.

In each experiment the autoclave was heated to the desired temperature. A stirring mechanism was used to provide for rapid and even heating of the autoclave contents. When the desired temperature was reached, the stirrer was stopped and the contents allowed to settle for two minutes. Liquid samples were then withdrawn from the reactor every five minutes.

The withdrawn samples from these experiments can be classified as follows.
(a) a green sludge similar to the feed sludge that never separated into phases.
(b) a mixture of solids and water which separated rapidly.
(c) a mixture of a yellowish emulsion layer and solids.

The "a" of sample indicates that no separation had occurred. The "b" type of sample indicates that the sludge had separated and that the oil had floated to the top of the autoclave. The "c" type of sample occurred occasionally, was not repeatable, and not readily explainable.

Table 3 below shows the results of the experiments, with the numbers indicating the COD of the water phase in mg/l. Phase separation occurred almost immediately with the API Sludge at 350° C., and after about 15 minutes at 300° C. The DAF Float separated after about 15 minutes at 350° C. with no appreciable separation occurring at 300° C. The third sample separated into three phases within 15 minutes at both 350° C. and 300° C. When the autoclave contents were cooled at the end of each experiment, the contents were very similar in appearance to the treated products from the first set of experiments, the results of which are shown in Table 2.

TABLE 3

| | Time Required to Achieve Separation | | | | | |
|---|---|---|---|---|---|---|
| Time, | API Sludge | | DAF Float | | 3rd Emulsion | |
| min | 350° C. | 300° C. | 350° C. | 300° C. | 350° C. | 300° C. |
| 0 | 2,400 | NS | NS | NS | 150,000 | 118,000 |
| 15 | 2,650(a) | 9,400 | 24,500 | NS | 2,900 | 6,450 |
| 30 | 7,200(a) | 6,200 | 6,800 | NS | 4,800 | 5,450 |
| 45 | 3,400 | 6,900 | 5,100 | NS | 20,500 | — |
| 60 | — | 6,150 | — | NS | — | — |

NS - No separation
(a) - Yellow emulsion

The numbers in Table 3 identify the COD, with a reduction of COD in the water phase indicating that an oil-water phase separation has occurred.

With the oil field emulsion that was tested, best separation was achieved at 400° C. with a reduced nickel catalyst being used. The exact mechanism by which the catalyst assists in the separation is not fully understood. When nickel is used to assist in the phase separation, the reaction should be conducted anaerobically.

In accordance with the invention, emulsions which are extremely difficult to break might first be heated and pressurized to much greater than 300° C. and the vapor pressure of water at such temperature. Then, temperature and pressure could be reduced to provide a lower withdraw temperature, but above about 300° C., and a lower withdraw pressure, but above the vapor pressure of water at the lower withdraw temperature.

Figure 2:
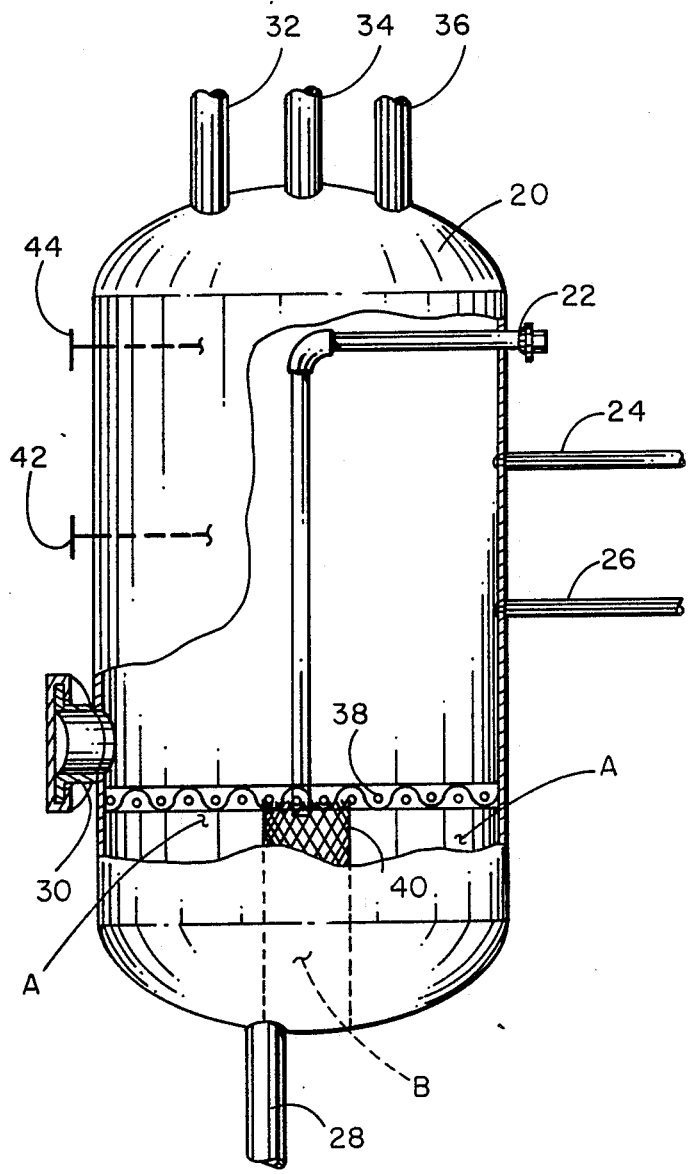
FIG. 2 is a fragmentary and diagrammatic side-elevational view of a vessel that usable in accordance with the invention.

FIGS. 2 and 3 illustrate possible vessel designs that would be usable for carrying out the invention process. Both the FIG. 2 and FIG. 3 vessels are elongated, with the FIG. 2 being oriented vertically and the FIG. 4 vessel being oriented horizontally. In the illustrated embodiments, both vessels would be intended to operate in a continuous flow mode.

Referring first to FIG. 2, a vessel 20 includes one primary inlet, and three primary outlets to correspond to the oil, water and solid phases. The inlet feed pipe is designated with numeral 22. It extends horizontally into the upper portion of vessel 20 and curves to extend vertically downward generally along the vessel central longitudinal axis. An oil draw outlet pipe 24 is provided in the upper portion of vessel 20, and beneath feed inlet 22. Towards the middle of vessel 20, and beneath oil draw 24, a water draw outlet 26 is provided. The oil and water draws 24, 26 are vertically positioned to draw oil and water respectively from the anticipated levels of oil and water within vessel 20 under steady state operating conditions. A drain and solids outlet 28 is provided at the bottom of the vessel 20. A lower vessel access opening 30 is provided for servicing and cleaning.

Three outlets 32, 34, 36 are provided at the top of vessel 20. Outlet 32 is adapted for removing the gas which is generated during the process for disposal or other recycle within a refinery. Outlet 34 is provided for venting purposes when necessary, and would be sealable. Outlet 36 is for safety pressure relief, and correspondingly fitted with an appropriate relief valve (not shown).

The solids level within vessel 20 is maintained and kept from rising by means of a mesh screen 38. Screen 38 acts as a filter to prevent any tendency of the separated solids from migrating upwards after separation. Inlet feed pipe 20 extends through screen 38 to a position just therebeneath. Beneath screen 38, inlet pipe 22 discharges into an axially aligned volume defined by a cylindrical screen 40. Screen 40 is provided to minimize flow turbulence, the result of the feed material being discharged from feed pipe 22.

In this manner, screens 38 and 40 define an annular chamber A which surrounds a central cylindrical chamber B within the lower portion of the tank within which the separated solids will be present. Screen 40 is preferably of a larger mesh than the screen 38. Examples would be ⅛ inch mesh for screen 40, with a 5/64 inch mesh for screen 38. Solids and drain outlet opening 28 is positioned slightly off the longitudinal center axis of vessel 20 and communicates with both chambers A and B.

Water and oil monitoring level controllers, 42, 44 are provided with vessel 20 to monitor the elevations of the water and oil levels therewithin.

The feed material flowing through inlet tube 22 could be elevated in temperature and prepressurized to maintain the contents within vessel 20 at a desired temperature and pressure for a sufficient period of time to effect the separation and maintain steady state conditions. Alternately or in addition thereto, heating or pressurization means could be provided within vessel 20 for maintaining desired temperature/pressure control.

FIG. 3 illustrates a horizontally oriented vessel 50 which is constructed and operates in a somewhat concept. Vessel 50 has an inlet feed pipe 52, an oil draw 54, a water draw 56, and a solids outlet 58. A gas outlet 60, a sealable vent 62, and a pressure relief outlet 64 are provided atop vessel 50, somewhat similar to the FIG. 2 embodiment.

Inlet pipe 52 extends downwardly from the top of vessel 50 adjacent the vessel left end as shown. Water draw 56 extends downwardly from the bottom center of vessel 50, while oil draw 54 extends downwardly from the bottom right portion of vessel 50.

A screen 66 extends vertically across vessel 50 in the left portion to define a left volume C or chamber within which the solids are adapted to be retained. A cylindrical screen 68 is provided within volume C about the outlet of feed inlet tube 52 to cut down on turbulence from inlet pipe 52, as was similarly provided in the FIG. 2 embodiment.

A solid vertical weir 70 is provided in the right hand portion of vessel 50. Weir 70 extends upwardly from the bottom of vessel 50 to approximately four-fifths of the elevation of the vessel. Oil draw 54 is positioned to the right of weir 70, while water draw 56 is positioned to the left of weir 70. Under steady state operation, a thin oil/water separation interface 72 will develop at or below the upper elevation of weir 70 which will separate and define the oil and water phases. Weir 70 will confine the water phase to an enlarged lower-left quadrant of vessel 50, with the oil phase being stabilized into the remaining reduced quadrants of vessel 50.

The solids from the phase separation will be retained within chamber C in part as the result of screen 66, and withdrawn through solids outlet 58. Solid outlet 58 communicates with both chamber C and within the volume defined by cylindrical screen 68 within which inlet tube 52 discharges.

Oil and water level controllers, 74, 76 respectively, are provided in a similar manner to those provided with the FIG. 2 embodiment.

FIG. 4 illustrates how an apparatus such as shown in FIGS. 2 or 3 could be incorporated within the FIG. 1 treatment system to practice a process in accordance with the invention. As illustrated, an apparatus 20, 50 or otherwise could receive API Separator Sludge and DAF Float for processing. The separated oil phase from vessel 20, 50 could be combined with the oil phase exiting the API Separator and rerun to the refinery. The water phase from vessel 20, 50 could be combined with the water outlet effluent stream from the DAF unit. The solids could be removed and treated separately.

Although the invention as shown and described is preferably conducted under continuous flow conditions, the invention could also be conducted in batches.

In compliance with the statute, the invention has been described in language more or less specific as to structural and methodical features. It is to be understood, however, that the invention is not limited to the specific features shown and described, since the means and construction herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A reclamation process for treating a highly stable petroleum oil and water emulsion derived from producing or processing crude oil, the emulsion having retained solids suspended therein, the process comprising the following steps:

heating the emulsion to a predetermined temperature at or above about 300° C. and pressurizing the emulsion to a predetermined pressure above the vapor pressure of water at the predetermined temperature to produce a heated and pressurized fluid;

breaking the emulsion by containing the heated and pressurized fluid in a single vessel at the predetermined temperature and pressure for a predetermined period of time to effectively separate the emulsion into substantially distinct first, second and third phases, the first phase comprising primarily the oil, the second phase comprising primarily the water, the third phase comprising primarily the solids; and separately withdrawing the first, second and third phases from the single vessel at a withdraw temperature between about 300° C. and 374° C. and a withdraw pressure above the vapor pressure of water at the withdraw temperature.

2. The reclamation process of claim 1 wherein the predetermined period of time is less than or equal to about fifteen minutes.

3. The reclamation process of claim 1 wherein the predetermined period of time is less than or equal to about sixty minutes.

4. The reclamation process of claim 1 wherein the predetermined pressure is between 1400 and 2500 psig.

5. The reclamation process of claim 4 wherein the predetermined period of time is less than or equal to about fifteen minutes.

6. The reclamation process of claim 1 further comprising containing the heated and pressurized fluid in a vessel containing a nickel catalyst to assist in effecting phase separation.

7. A process for treating highly stable petroleum oil and water emulsion derived from producing or processing crude oil, the emulsion having retained solids suspended therein, the process comprising the following steps:

heating the emulsion to a predetermined temperature at or above about 300° C. and below the 374° C. critical point of water, and pressurizing the emulsion to a predetermined pressure above the vapor pressure of water at the predetermined temperature to produce a heated and pressurized liquid;

breaking the emulsion by containing the heated and pressurized fluid in a single vessel at the predetermined temperature and pressure for a predetermined period of time to effectively separate the emulsion into substantially distinct first, second and third phases, the first phase comprising primarily the oil, the second phase comprising primarily the water, the third phase comprising primarily the solids; and separately withdrawing the first, second and third phases from the single vessel at the predetermined temperature and pressure.

8. The reclamation process of claim 7 wherein the predetermined period of time is less than or equal to about fifteen minutes.

9. The reclamation process of claim 7 wherein the predetermined pressure is between about 1400 psig and 3193 psig.

10. The reclamation process of claim 7 wherein the predetermined temperature is approximately 350° C. and the predetermined pressure is approximately 2500 psig.

11. The reclamation process of claim 10 wherein the predetermined period of time is less than or equal to about fifteen minutes.

12. The reclamation process of claim 7 further comprising containing the heated and pressurized fluid in a vessel containing a nickel catalyst to assist in effecting phase separation.

13. A reclamation process for treating a highly stable petroleum oil and water emulsion derived from producing or processing crude oil, the emulsion having retained solids suspended therein, the process comprising the following steps:

heating the emulsion to a predetermined temperature at or above about 300° C. and pressurizing the emulsion to a predetermined pressure above the vapor pressure of water at the predetermined temperature to produce a heated and pressurized fluid;

breaking the emulsion by containing the fluid in a single vessel at a temperature above about 300° C. and above the vapor pressure of water for a predetermined period of time to effectively separate the emulsion into substantially distinct first, second and third phases, the first phase comprising primarily the oil, the second phase comprising primarily the water, the third phase comprising primarily the solids, the vessel containing a nickel catalyst to assist in effecting phase separation; and separately withdrawing the first, second and third phases from the single vessel at a withdraw temperature above about 300° C. and above the vapor pressure of water at the withdraw temperature.

* * * * *